May 9, 1961 E. H. SCHUSTACK 2,983,527
PIPE COUPLING HAVING GASKET EXPANDING MEANS
Filed July 7, 1954
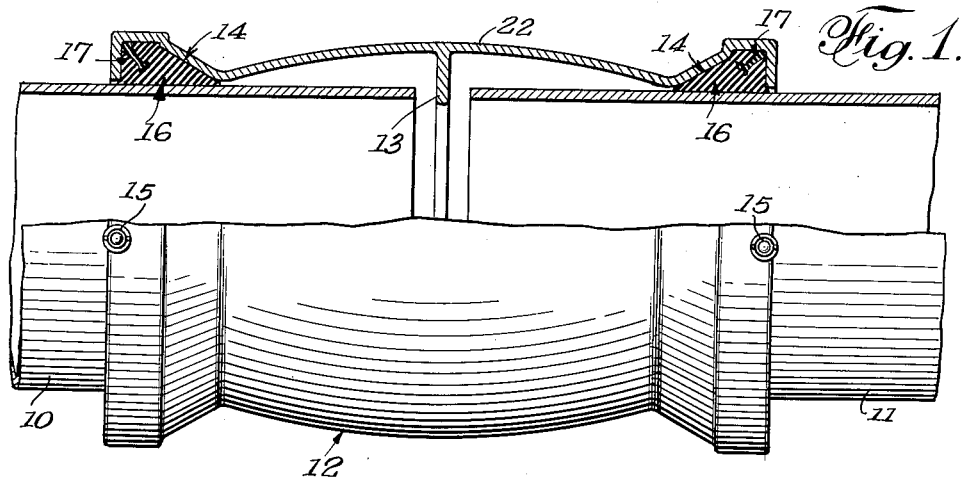
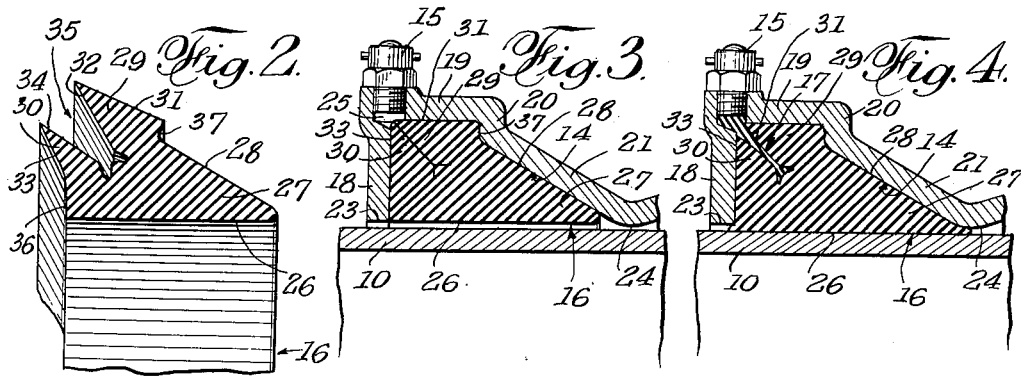
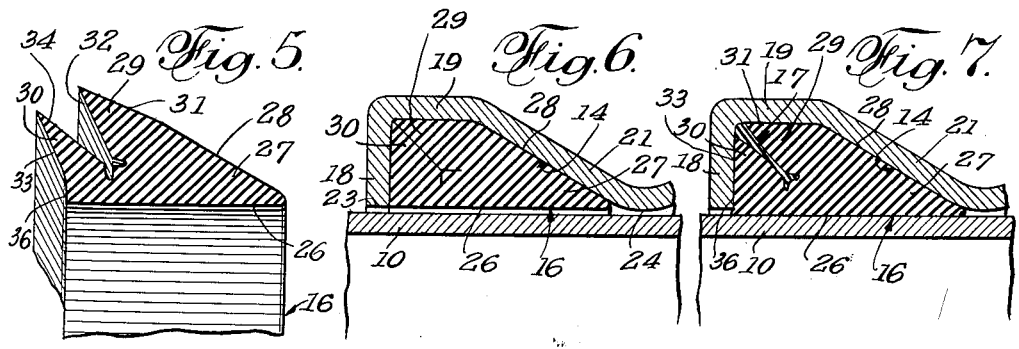
INVENTOR.
EDWARD H. SCHUSTACK
BY C. G. Stratton
ATTORNEY

United States Patent Office 2,983,527
Patented May 9, 1961

2,983,527

PIPE COUPLING HAVING GASKET EXPANDING MEANS

Edward H. Schustack, 1816 N. Stanley Ave., Los Angeles 46, Calif.

Filed July 7, 1954, Ser. No. 441,882

6 Claims. (Cl. 285—96)

This invention relates to pipe couplings of the type that embody a cylindrical or tubular member into which the ends of two adjacent pipes extend and are provided with gasket sealing between said sleeve and the pipe ends. This invention, more particularly, deals with improvements in said gaskets, and it is an object of this invention to provide improved and leakage-proof gaskets for the above and analogous purposes.

Another object of the invention is to provide a gasket construction that achieves leakage-proof sealing by the pressure introduction of liquid rubber into a rubber gasket initially positioned in a sleeve, as above indicated, or in a comparable position, and to employ such liquid rubber in a manner to force the gasket into firm sealing engagement both against the sleeve and the pipe over which the sleeve is fitted.

A further object of the invention is to provide a gasket construction according to the foregoing, in which seal-breaking air is eliminated.

A still further object of the invention is to provide a mechanical or similar interfit between the gasket and the sleeve that holds the former in position clear of a pipe end introduced into said sleeve.

A still further object of the invention is to provide the gasket with means that confines the liquid rubber against leakage past the gasket when said liquid rubber is being introduced under pressure.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

Fig. 1 is an elevational view in quarter section of a pipe coupling embodying gaskets constructed in accordance with the present invention.

Fig. 2 is an enlarged cross-sectional view of the gasket at the left end of the coupling in Fig. 1, the same being shown in the form in which it is produced and before introduction into the coupling.

Fig. 3 is a similar cross-sectional view showing the gasket of Fig. 2 in position in a coupling and before final treatment to make the same leakage-proof.

Fig. 4 is a similar cross-sectional view of said gasket after leakage-proofing thereof.

Figs. 5, 6 and 7, respectively, are views similar to Figs. 2, 3 and 4 and showing a modification.

Fig. 1 shows two pipes 10 and 11 that are connected by a pipe coupling 12 of the sleeve or tubular type and preferably embodying an inwardly directed stop flange 13 or the like to limit the entry of said pipes into sleeve 12. According to the invention, each end of coupling sleeve 12 is formed to have an annular groove or seat 14, a pressure fitting 15 carried by the walls of each said groove or seat and opening into the latter, an elastic or compressible gasket 16 disposed within each said seat 14, and supplemental material 17 introduced into each gasket through the mentioned pressure fittings 15.

Since the gasket constructions at the opposite ends of coupling sleeve 12 are alike except that the same are reversed or of opposite design, only the construction at the left will be described in detail.

In the form of the invention shown in Figs. 1, 3 and 4, the walls defining annular groove 14 are shown as comprising an end flange wall 18, an outer or peripheral wall 19 extending at right angles from wall 18, a shoulder wall 20 parallel to and spaced from wall 18, and a sloping or conical wall 21 extending from shoulder wall 20 in a direction away from end wall 18 and inward toward the axis of sleeve 12. The latter is provided with a connecting portion 22 that extends between the inner ends of conical walls 21, at each end of said sleeve, and the mentioned stop flange 13 is carried by said portion 22.

The internal diameter of flange wall 18 at 23, and also at the innermost portion of conical wall 21 at 24, is suitably larger than the outer diameter of pipes 10 and 11. In practice, the clearance between pipes and coupling sleeve at these points is in the nature of $\frac{1}{16}''$ or $\frac{3}{32}''$, these clearances enabling ready introduction of the pipes into the coupling sleeve.

The pressure fittings 15 are of the type usually employed for introducing lubricant in bearings and similar devices and, therefore, these fittings are conventional check valves. In this instance, a fitting 15 is affixed by the usual threads to the corner of each seat 14 where walls 18 and 19 meet. Said fittings open inwardly on passages 25 which, in turn, open on annular seats 14.

The gasket 16, shown in Fig. 2, is formed in the following manner to fit seat 14 to the complete exclusion of air from said seat.

Gasket 16 preferably comprises a compound of natural and synthetic rubbers having a Shore hardness in the nature of 70 to 80, but not necessarily restricted to such hardness. Said gasket preferably comprises an annulus having its internal diameter 26 approximating the internal diametral size of flange 18 so as, as seen in Fig. 3, to be clear of pipes 10 and 11 when assembly of the coupling is being effected.

The gasket 16 is provided with a wedge-shaped end 27 defined between internal diameter 26 and an outer sloping or conical face 28 that has approximately the angle of wall 21 of the coupling sleeve. Opposite the wedge-shaped end 27, said gasket is provided with two pliable annular lip flanges 29 and 30, the flange 29 having a sectional form defined between faces 31 and 32 which include an angle of 45°, and the flange 30 having a similar sectional form defined between faces 33 and 34 and also including an angle of 45°. Normally, said lip flanges diverge from each other so that faces 32 and 34 are separated and define an annular slot 35. Faces 31 and 33, therefore, approach parallelism but, in any case, include an acute angle. One lip flange may be larger than the other but together they should total 90° of angular extent.

The face 33, together with the face 36 from which the former angularly extends, conforms substantially to the inner face of outer flange wall 18. Face 29 conforms in extent to the inner face of wall 19. To complete conformation of the gasket to seat 14, the same is provided with a face 37 that conforms in extent to wall 20 and is disposed between faces 28 and 31.

The gasket thus provided is pressed into seat 14 to assume the condition of Fig. 3, wherein lip flange 29 is flexed or forced inwardly by the seat wall 19 and lip flange 30 is flexed or forced laterally by seat wall 18 to bring the faces 32 and 34 of said respective lip flanges into full face contact completely eliminating slot 35. Since gasket faces 33 and 36 will be in frictional engagement with wall 18 and face 37 will be crowded into firm frictional engagement with wall 20, the gasket will retain its position wholly filling the seat 14 because the shoulder wall 20, together with the friction at wall 18, functions to contain the inward thrust developed by lip flange 29 and the lateral thrust developed by lip flange 30.

The above is based on a seat 14 in which the walls 18 and 19 are at right angles. Should the angle between said walls be other than 90° (the same may well be acute), the lips 29 and 30 will be designed as taught above but to conform to such change of angle.

A conventional pressure gun, filled with a liquid rubber compound, is connected to fitting 15 and used to force such liquid compound between the lips 29 and 30. Since said lips are self-sealing against the respective seat walls 19 and 18, the liquid rubber cannot escape past said lips and, therefore, is retained therebetween. As shown in Fig. 4, the gasket diametral face 26 will be forced into firm sealing engagement with either pipe 10 or pipe 11, as the case may be, as the liquid material 17 not only forces the lips into firm engagement with seat wall, but also presses the gasket tightly around the pipe. It will be evident that the supplemental rubber material 17, in the finished gasket, occupies a volume substantially equal to the volume of the initial clearance space between the pipe and the gasket.

Since no air was initially present in the gasket, none will be present in the gasket as sealed in place. Hence, leakage is greatly inhibited and the seal retained.

The supplemental material may advantageously comprise liquid thiokol with a suitable drying catalyst to give either rapid setting of the thiokol or, what may be preferred, relatively slow setting so that the seal may be tested before hardening of the supplemental material into a consistency comparable to that of the gasket 16. Slow drying material also enables all-day use of a loaded pressure gun without undue thickening or curing of the material within the gun. Further, a faulty seal may be easily corrected by a reapplication of pressure material to fittings 15, should test show the need for the same. It is especially compounded so as not to adhere to metal. This is usually done by incorporating an oil in the mixture.

In the modification, the wall 20 is omitted from seat 14 and, accordingly, the face 37 of the gasket is omitted also. By making the perimeter of face 31 somewhat longer than is necessary to fit the inner face of wall 19, the gasket will tend to hold itself in place sufficiently to establish the primary self-sealing of the lips 29 and 30, as in Fig. 6. The degree of friction developed on walls 18 and 21 by faces 33, 36 and 27 will control the stability of the gasket in place until the pipes may be inserted into the coupling. It may be desirable, in order to obviate separation between wall 19 and face 31 (with the attending possibility of trapping air), to provide for cementing said wall and face and preferably to the right of the lip 29.

The liquid material has a molasses type consistency and, therefore, can be handled by known apparatus that now forces certain greases under pressure. This thiokol-catalyst material does not shrink appreciably when curing and, therefore, represents the type of liquid material that may be used advantageously in the present invention. No solvent is present and the omission of the same obviates the possibility of loss of sealing pressure due to solvent evaporation. This mixture has great immunity to deterioration by water, gas and gasoline. The result of the present means is an "all-rubber" packing gasket that is seal-retaining for the reasons above indicated.

In the event that the gasket in the modification will not retain its position when initially inserted into seat 14, thereby causing the internal surface 26 thereof to be effectively smaller than the outer diameter of the pipe 10 or 11, as the case may be, the said surface may be lubricated to enable sliding the pipe into assembly while, at the same time, forcing the gasket firmly into its seat to the substantial exclusion of air. Thus, the space shown in Fig. 6 between pipe 10 and surface 26 will not be present. Some slight space, according to the degree of outward displacement of the gasket by the pipe, may be present between wall 19 and the gasket and the same will be filled when the pipe presses the latter firmly into its seat.

While the foregoing has illustrated and described what are now contemplated to be the best modes of carrying out the invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. A pipe coupling comprising a coupling sleeve adapted to loosely receive the ends of two pipes to be connected, each end of said sleeve being formed to have end, peripheral and conical walls defining an annular seat surrounding a pipe end and an all rubber gasket occupying said seat and comprising a pre-formed rubber annulus and provided with a wedge-shaped end and having an annular groove directed toward the corner of jointure of the end and peripheral walls and two lip flanges defining said groove, one said flange being in flexion engagement with the mentioned end wall and the other lip flange being in flexion engagement with the peripheral wall, said lip-defining groove extending from said corner toward the wedge-shaped end of the gasket, said two walls, thereby, flexing the lip flanges together to the exclusion of air therebetween, and initially liquid rubber material inserted under pressure between the lip flanges to force the same apart and simultaneously constrict the annular gasket around the pipe that extends therethrough and in a direction toward and into crowding engagement with the conical wall of the sleeve.

2. A pipe coupling comprising a coupling sleeve adapted to loosely receive the ends of two pipes to be connected, each end of said sleeve being formed to have end, peripheral and conical walls defining an annular seat surrounding a pipe end and an all rubber gasket occupying said seat and comprising a pre-formed rubber annulus and provided with a wedge-shaped end and having an annular groove directed toward the corner of jointure of the end and peripheral walls and two lip flanges defining said groove, one said flange being in flexion engagement with the mentioned end wall and the other lip flange being in flexion engagement with the peripheral wall, said lip-defining groove extending from said corner toward the wedge-shaped end of the gasket, said two walls, thereby, flexing the lip flanges together to the exclusion of air therebetween, a shoulder wall between the peripheral and the conical walls and opposite to the end wall, said gasket being provided with an annular shoulder face in engagement with the shoulder wall to cooperate with the end wall to confine the gasket in said seat to the exclusion of air in said seat, and initially liquid rubber material inserted under pressure between the lip flanges to force the same apart and simultaneously constrict the annular gasket around the pipe that extends therethrough and in a direction toward and into crowding engagement with the conical wall of the sleeve.

3. In a pipe coupling, means to seal around a pipe comprising: a sleeve into an end of which the pipe loosely extends, said sleeve end being formed to have an annular seat and said seat being defined within a conical annular wall, an end annular flange wall longitudinally spaced from the larger end of the conical wall, and an outer tubular wall connecting said conical and flange walls, an elastic gasket initially loosely occupying said seat and having outer faces generally conforming to the mentioned walls of the sleeve end and having an inner face generally parallel to the outer face of the pipe, said gasket having a wedge-shaped end disposed where said conical wall surrounds the pipe, said gasket being provided with an annular slot directed angularly inward from the corner thereof that fits the corner formed by the mentioned flange and tubular walls toward said wedge-shaped end, said gasket having lip portions that define the mentioned slots, and an initially liquid material occupying said slot and in engagement with said lips to spread the same into sealing engagement with the respective sleeve end walls with which engaged and simultaneously to force the wedge portion of the gasket into crowding engagement between the conical wall and the pipe and into sealing engagement with said wall and the pipe.

4. In a pipe coupling according to claim 3: an annular shoulder wall interposed between and connecting the conical and outer tubular walls, said shoulder wall having an inner annular face opposite and generally parallel to the flange wall, the gasket being provided with an annular face to frictionally engage the inner annular face of the shoulder wall, and the portion of the gasket between said flange and shoulder walls and containing the mentioned slot-defining lips will be frictionally gripped between the latter walls.

5. In a pipe coupling comprising a coupling sleeve having an annular seat adapted to surround a pipe and the seat being substantially wedge-shaped in cross-section to be tapered at one end, being defined at said end by a conical wall of the sleeve and at the opposite end by an outer peripheral wall that extends from the conical wall and by a flange wall extending substantially at right angles to the peripheral wall, a pre-formed resilient sealing gasket within and generally conforming to said seat and having an initial cross-sectional shape to fit into the mentioned seat and in contact with the mentioned seat-defining walls of the sleeve, the initial cross-sectional size of the gasket being smaller than the seat to loosely engage around a pipe surrounded by the seat, two lip flanges formed in said gasket and defining an annular groove open toward the annular meeting line of the peripheral and flange walls, said flanges being in flexion engagement with said respective peripheral and flange walls, and an initially-liquid material cured to a consistency similar to that of the pre-formed gasket and occupying said annular groove, both the gasket and said material occupying the seat to the exclusion of air and said material being under such pressure as to force the tapered end of the gasket into crowding engagement with the conical wall of the sleeve and the pipe and to force the opposite side of the gasket firmly against said pipe.

6. In a pipe coupling in which a pipe end is loosely surrounded by an end of a coupling sleeve, a conical wall, a cylindrical wall extending from the larger end of the conical wall, and a flange wall extending from the cylindrical wall substantially at right angles to the cylindrical wall, the pipe end that is surrounded by said three walls cooperating with said walls to form an annular gasket seat that is cylindrical where the same is coextensive with the cylindrical wall and wedge-shaped where the same is coextensive with the conical wall, a gasket of compressible material generally conforming in shape to said seat and initially loosely disposed therein, said gasket, thereby, having an annular cylindrical part at one side thereof and a wedge-shaped apart at the opposite side, an annular slit in said cylindrical part of the gasket and extending angularly in a direction toward the wedge-shaped part of the annular outer corner edge of the cylindrical part and the annular edge where the cylindrical and flange walls of the sleeve end meet, said cylindrical part being divided by said slit into a lip engaged with the annular wall and a lip engaged with the flange wall of the sleeve end, and means disposed at said meeting edge of the cylindrical and flange walls to pass fluid material into the slit to wedge the lips defining the same apart and thereby force the wedge-shaped side of the gasket firmly into the wedge-shaped portion of the mentioned gasket seat and tightly around the pipe.

References Cited in the file of this patent
UNITED STATES PATENTS

| | | |
|---|---|---|
| 865,497 | Kenyon | Sept. 10, 1907 |
| 1,800,085 | Kroeger et al. | Apr. 7, 1931 |
| 2,099,722 | Byers | Nov. 23, 1937 |
| 2,177,184 | Martin et al. | Oct. 24, 1939 |
| 2,462,348 | Batchler | Feb. 22, 1949 |
| 2,469,772 | Johnson | May 10, 1949 |
| 2,502,351 | Smith | Mar. 28, 1950 |